Patented May 22, 1945

2,376,656

UNITED STATES PATENT OFFICE 2,376,656

DISPERSION OF GUMS

Ben F. Buchanan, Leonia, N. J., assignor to American Maize-Products Company, a corporation of Maine No Drawing. Application May 20, 1942,
Serial No. 443,845

5 Claims. (Cl. 252—363.5)

This invention relates to a composition for promoting dispersion of a gum in water and particularly to the dispersion of a true gum in such manner as to prevent the lumping together of the gum and to effect the dispersion quickly and completely.

In dispersing a true gum in water, it is customary to mix the gum in divided form with water and allow a relatively long period of time for the gum to soak in the water. During this soaking period, the gum hydrates and forms a gelatinous film around particles that may be nearly or quite dry in the center. These particles with the exterior gelatinous coatings form lumps or balls, so that a relatively long time or extremely vigorous agitation is required to disperse the gum completely in the water.

To minimize this difficulty, premixing of the gum in dry form with sucrose, dextrose, or other sugar in large volume has frequently been resorted to so as to space apart the particles of gum and thus reduce the tendency to lumping when the gum is stirred into water.

The present invention provides a method and composition for overcoming the difficulties in the dispersion of the gums without the need of premixing with a large bulk of sugar or like separating agent.

Briefly stated, the invention comprises the composition resulting from mixing a true gum with a water soluble lactate salt, preferably in proportion that is minor as compared to the amount of the gum. In the preferred embodiment, the invention comprises the admixture also of a very small proportion of water in addition to that normally present in most of the gums, the proportion of the additional water used being just adequate to make the particles of gum non-dusty and slightly moist without converting the surface portions of the particles to a sticky condition.

Compositions made as described and then stirred into cold or tepid water or other aqueous dispersing medium disperse quickly without the intermediate formation of objectionable lumps or balls.

As the gum used there is selected what is called herein a true gum as distinguished, for example, from rubber, chicle, and other water insoluble materials that are sometimes referred to as gums.

The term true gum is used herein to mean a natural gum that is soluble in water, dries to a firm product upon evaporation of most of the water normally associated with the gum in its natural state, and when so dried is susceptible to being reduced to powdered, granulated, or flaked form, as by milling or spray or drum drying. These gums normally contain around about 5 to 12% of water, but even in such condition are flowable, that is, may be poured from a sack or container since they are not so sticky as to form large coherent masses of material.

Among such true gums that may be used to advantage in the present invention are tragacanth, karaya, locust bean gum, and water soluble alginic acid compounds including the acid itself and its alkali metal (sodium, potassium, and ammonium) salts. Other gums meeting the general requirements stated may be substituted for those specifically named.

The lactate to be used must be in the form of a water soluble salt. Thus, there may be used the alkali metal lactates including sodium, potassium, and ammonium lactates, calcium lactate, and lactates of the ammonium derivatives such as the amines, particularly triethanolamine lactate. Magnesium and zinc lactates are appreciably soluble in water and are operative for the present purpose although objectionable because of taste or physiological properties when the product is to be used in the food industries. The triethanolamine lactate also is not recommended in making food materials.

The proportion of lactate may vary considerably but should be minor, for example, 0.1 to 5 parts for 100 parts of the selected gum, the proportions being by weight and on the dry basis. Somewhat more than 5 parts of the lactate may be used, although such larger proportion is unnecessary. Preferably I use about 0.3 to 2.5 parts of the lactate to 100 parts of the gum.

The lactate may be mixed with the gum in solid divided condition, say as powder, granules, or flakes. Or the lactate may be incorporated into the solution of the gum before the latter is reduced to solid form, in case the gum during its normal preparation for commercial distribution is obtained in the form of a solution previous to solidification, as is the case in the manufacture of the alginates, for example. In any case, the lactate is mixed with the gum before the gum is incorporated into the large amount of water in which the gum is to be ultimately dispersed.

For best results, but not necessarily for all purposes, the gum and lactate mixture is made slightly moist in advance of introduction into the whole mass of water for effecting final dispersion. Thus, there is admixed a limited amount of water, suitably about 0.2 to 4 or 5% of water on the weight of the gum. The use of this water in addition to that normally present in the gum used increases the rate of dispersion of the gum considerably over that obtained by the incorporation of lactate alone.

The proportion of water varies somewhat with the particular lactate selected. A lactate that is very soluble and has a tendency to absorb and retain moisture requires somewhat less water than one that does not have these properties. Thus, the proportion of water used within the above range may be somewhat smaller with an alkali metal lactate than with calcium lactate. With the latter, a minimum of about 0.5% of moisture on the weight of the gum is preferred.

The small amount of moisture added in this manner serves to distribute a substantial part of the lactate as a film over the individual particles of the gum and thus promote intimacy of association with or even solution of the lactate in the surface portions of the said particles before the whole is introduced into the water for the ultimate dispersion.

The invention will be further illustrated by the following specific examples of the practice of it.

EXAMPLE 1

*Formula*

|  | Parts |
|---|---|
| Sodium alginate | 98 |
| Sodium lactate solution (50% water) | 2 |

*Procedure*

These materials are intimately mixed, so that the alginate is no longer in the original dusty form. The mixed composition is then dispersed in an excess of water, say, from 20 to 80 parts of water to 1 part of the composition.

Such dispersion is accomplished readily by adding the water in cold or tepid condition, directly, gradually, and with constant stirring, to the gum and lactate composition. In this manner, hydration of the gum is accomplished within a relatively short time, ordinarily about 2 to 5 minutes, whereas without the lactate vigorous agitation would be required for from 20 minutes to 1 hour to cause hydration of the alginate sufficiently for use.

EXAMPLE 2

*Formula*

|  | Parts |
|---|---|
| Ammonium alginate | 96 |
| Calcium lactate (mono or penta hydrate) | 4 |

*Procedure*

These two materials in finely divided condition are thoroughly mixed in the dry condition and dispersion accomplished by adding gradually the desired amount of cold or tepid water directly to the dry mixture with constant stirring during the addition of the water.

Hydration of the gum when the mixture is stirred with water proceeds in about the same manner as in Example 1, although not so rapidly, since the gum has not been prewetted with a small proportion of water.

EXAMPLE 3

The procedures of Examples 1 and 2 is followed except that another of the alginic acid compounds, gum tragacanth, karaya, locust bean gum or a mixture of them is substituted part for part for all or a part of the alginates used in the examples. In each case, a great improvement in the rate of dispersion in cold water is obtained due to the use of the lactate.

In place of water as the dispersion media there may be used other aqueous media, as for example milk or cream and sweetened, flavored, or colored water.

The compositions made as described are useful in the manufacture of ice cream, ices, and frozen desserts in general, the composition being substituted for the usual gum component, ordinarily the stabilizer, of such products on the basis of 100 parts of the gum in my composition for an equal weight of the gum as used previously.

The composition may also be used in the confectionery and bakery industry in place of the gums conventionally used alone for stabilizing water dispersions as, for example, for the prevention of "weeping" or slowness of setting of marshmallows.

The lactates seem to be unique among salts in their action in increasing greatly the dispersion rate of the true gums. Tests with closely related products including salts of such other hydroxy acids as tartaric and citric acids have failed to develop a satisfactory substitute for the lactate. The lactates make the rate of dispersion of the gum so large that the gum dissolves (disperses) before it can form into difficultly dispersible balls.

It will be understood also that it is intended to cover all changes and modifications of the example of the invention herein chosen for the purpose of illustration which do not constitute departures from the spirit and scope of the invention.

What I claim is:

1. A composition of matter consisting essentially of a true gum in solid comminuted condition and as a dispersing material a water soluble lactate salt intimately mixed with the particles of the gum, the proportion of the lactate salt being 0.1 to 5 parts by weight for 100 parts of the gum.

2. A composition of matter consisting essentially of a true gum in solid comminuted condition and as a dispersing material a water soluble lactate salt intimately mixed with the particles of the gum in the proportion of 0.1 to 5 parts of the lactate by weight to 100 parts of the gum, the composition including water in addition to that normally present in the gum, the proportion of the additional water being 0.2 to 5 parts by weight for 100 parts of the gum, and serving to make the particles non-dusty and increase the rate of dispersion of the composition on mixing with an aqueous liquid medium.

3. A composition as described in claim 1, the gum being a water-soluble alginate.

4. A composition as described in claim 1, the gum being gum tragacanth.

5. A composition of matter as described in claim 1, the said lactate salt being sodium lactate and the proportion of it being 0.3 to 2.5 parts by weight for 100 parts of the gum.

BEN F. BUCHANAN.